3,069,455
DIMERIZATION REACTION
David W. Lum, Cincinnati, Karl Koch, Norwood, and Irving L. Mador, Cincinnati, Ohio, assignors to National Distillers and Chemical Corporation, New York, N.Y., a corporation of Virginia
No Drawing. Filed Nov. 21, 1958, Ser. No. 775,372
11 Claims. (Cl. 260—465)

The present invention relates to a process for dimerization of certain organic compounds containing an active hydrogen atom and, more particularly, to a process for dimerization of organic compounds containing an active methylene group. More specifically, the invention relates to dimerization of an ester of phenylacetic acid, such as methylphenylacetate to dimethyl-$\alpha,\beta$-diphenylsuccinate, phenylacetonitrile to diphenylsuccinonitrile, methyl acetate to dimethyl succinate, etc.

In accordance with this invention, an organic compound containing an active hydrogen atom is subjected to contact in liquid phase with an oxide or an organic salt of a metal ion having a reduction potential, measured in aqueous solution, of $+0.16$ to $0.91$ volts and, embodied herein, is such a process in which the salts are preformed or formed in situ.

Illustrative of compounds for use in the dimerization process embodied herein, and which contain an active hydrogen atom, are alkyl or aryl esters of phenylacetic acid, diphenylmethane, phenylacetonitrile, phenyl acetone, etc. Structurally, the following are representative of such compounds in which Ar represents an aromatic ring, R and R' represent hydrogen, an aliphatic group or an aromatic group:

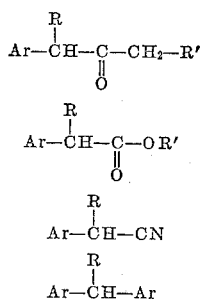

Within the scope of such compounds for use in the process embodied herein, preferred compounds contain, attached to a methylene group to be dimerized, one phenyl group and one other activating group such as phenyl, nitrile, carbonyl or carboxyl.

Illustrative of the metal ions of the salts for the dimerization reaction embodied herein are salts of copper ($Cu^{+2}$), silver ($Ag^{+1}$), mercury ($Hg^{+2}$) and iron ($Fe^{+3}$) and, particularly, in the form of oxides or organic salts thereof such as benzoates, acetates, oleates, octanoates, etc. Thus, in the stated reaction, such metal ions are reduced to $Cu^{+1}$, $Ag^0$, $Hg^0$ and $Fe^{+2}$, respectively and, as described more fully hereinafter, may be reoxidized and reused for the dimerization reaction.

The reaction may be carried out over a rather broad range of temperature such, for example, from about 50° to about 250° C. but, preferably, from about 95 to about 210° C. The reaction can be carried out at atmospheric or elevated pressures and, for example, up to about 500 p.s.i. In instances wherein the vapor pressure of the compound to be dimerized exceeds one atmosphere within the generic temperature range set forth hereinbefore, use of pressure is required.

In general, the compound to be dimerized is contacted with a substantially stoichiometric amount of the metal salt and, in preferred aspect, an excess of the compound to be dimerized in the range of twenty mole percent up to ten-fold excess is used. In preferred embodiments, the reaction is carried out so that the compound to be dimerized functions as the reaction medium but, if desired, inert reaction mediums can be used such, for example, methylbenzoate, ethylbenzoate, pyridine, methyl picoline, dimethylformamide, etc., provided the solvent does not contain a hydrogen atom which is more active than that of the monomer to be dimerized.

The time required for effecting the dimerization reaction depends on the reactants, reaction conditions, etc., employed and, in general, may vary from a few minutes up to several hours.

In order to further describe the invention, the following embodiments are set forth for purposes of illustration and not limitation. For such embodiments, the reactions were carried out in a 200 ml. round-bottomed Pyrex flask fitted with a water cooled condenser. After mixing the monomer and metal salt, the system was flushed with nitrogen and a nitrogen atmosphere was maintained over the reaction mixture. The monomer-salt mixture was slowly heated while observing evidence of oxidation as, for example, in the case of cupric salts, the disappearance of the characteristic blue color of cupric ions; in the case of mercuric salts, the formation of mercury, etc. Upon observance thereof, the reaction mixture was cooled, filtered at 60–80° C. to remove any solid matter and both the filtrate and precipitate examined for presence of dimer product.

EXAMPLE 1

105 gm. of methylphenylacetate was heated with 5 gm. of silver acetate under a cover of nitrogen to 215° C. and held at this temperature for 15 minutes. A silver mirror formed on the sides of the flask then broke off to form a heavy gray precipitate. The reaction mixture was cooled to about 70° C., filtered and the filtrate concentrated by vacuum distillation. The residue was then crystallized by adding 50 ml. of methanol to yield 1.6 gm. of the dimer, dimethyl-$\alpha,\beta$-diphenylsuccinate.

EXAMPLE 2

100 gm. of methylphenylacetate and 7.5 gm. of cupric acetate hydrate were placed in a 200 ml. Pyrex flask and heated to 210° C. under a cover of nitrogen. The reaction mixture turned from dark blue to amber at about 185–190° C. then formed a red-brown precipitate. The reaction mixture was cooled to 70° C. and filtered. The dimer was recovered from the precipitate by extraction with hot acetone to give 1.0 gm. dimer (M.P. 220–222° C. corr.) on cooling plus 0.6 gm. by evaporation of the acetone filtrate. Vacuum distillation of the filtrate of the reaction mixture followed by crystallization of the residue with methanol yielded an additional 3.6 gm. of dimer, i.e., a total dimer yield of 5.2 gm. or a 92 percent yield based on cupric ion present.

EXAMPLE 3

100 gm. of methylphenylacetate was heated with 5.0 gm. of mercuric acetate under a cover of nitrogen. At about 150° C. the mercuric acetate was completely dissolved. The reaction mixture was heated to 200° C. and held there for ½ hour. The reaction mixture was cooled to 100° C., decanted from the metallic mercury present and cooled in an ice bath. The crystalline dimer (3.5 gm.) was filtered and washed with cold methanol. These washings plus methanol washings of the mercury were combined with the reaction mixture filtrate and vacuum distilled. The residue of this distillation was crystallized with a small amount of methanol to yield an additional 0.5 gm. of dimer. Total mercury metal recovered was 2.73 gm. or 88 percent of the total added as the acetate.

Yield of dimer equaled 98% based on the mercury metal recovered.

EXAMPLE 4

53.4 gms. of phenylacetone, 1.3 gm. of copper benzoate trihydrate and 0.5 gm. of benzoic acid were heated under a cover of nitrogen to 100° C. where the color of the reaction mixture changed from dark blue to red with a heavy orange precipitate. The temperature was lowered to about 25° C. and oxygen bubbled through for about 15 minutes to regenerate the dark blue color. The temperature was raised to 100° C. and again the reaction mixture turned red with the formation of an orange precipitate. The reaction mixture was filtered after cooling to 40–50° C. and the filtrate vacuum distilled. Extraction of the residue with warm ethanol gave white crystals on cooling, M.P. 199–204° C. Three recrystallizations from ethanol gave a white product, M.P. 200–202° C. identified as meso 3,4-diphenylhexanedione-2,5 (M.P. 201° C., literature), providing the following elemental analysis:

|  | Percent C | Percent H |
|---|---|---|
| Calculated for $C_{18}H_{18}O_2$ | 81.19 | 6.79 |
| Found | 80.92 | 6.67 |

EXAMPLE 5

100 gm. of methylphenylacetate, 6.0 gms. of copper benzoate dihydrate (0.0176 mole) and 2.5 gm. of benzoic acid were heated to 200° C. under a cover of nitrogen. As soon as all of the blue color had disappeared, the reaction mixture was cooled to 100° C. and molecular oxygen was bubbled through the reaction mixture for 15 minutes to reoxidize the cuprous ions and regenerate the original deep blue color. The reaction vessel was again flushed with nitrogen and heated to 200° C. where once again the color disappeared. This regeneration procedure was repeated three additional times. The dimer was isolated after cooling the reaction mixture to 70° C. by pouring the mixture into 200 ml. of methanol, cooling in an ice bath, and filtering off the crystallized product. 8.6 gm. of dimer was obtained. An additional 1.3 gm. of dimer was recovered from the filtrate by vacuum distillation and then crystallization of the residue with a small amount of methanol. Yield was 9.9 gm. or 75 percent based on the total cupric ions available ($5 \times 0.0176$).

EXAMPLE 6

84 gm. of diphenylmethane and 8.6 gm. of copper benzoate were heated under a cover of nitrogen. The mixture became viscous and difficult to stir at about 100° C. An additional 20 gm. of diphenylmethane was added and heating continued. The mixture became dark at about 140° C. and by 180° C. it was a dark greenish-brown. Heating was discontinued, the reaction mixture cooled and filtered. The filtrate was concentrated by vacuum distillation and the concentrate again filtered. On standing, the latter filtrate gave white crystals which melted at 210–211° C. (corr.) when recrystallized from ethanol, as compared to the literature listing of 209–211° C. for tetraphenylethane. Infrared analysis was consistent with a dimer of diphenylmethane.

EXAMPLE 7

50 gm. of methylphenylacetate and 13.6 gm. of iron octanoate were heated to 200° C. under a cover of nitrogen. On cooling the reaction mixture was distilled under reduced pressure. The dark residue of this distillation was suspended in methanol and filtered. The methanol insoluble material was extracted with ethyl acetate and evaporated on a steam bath. The white solid thus obtained was recrystallized from methanol to give the dimer, dimethyl-α, β-diphenyl succinate, M.P. 220–222° C.

EXAMPLE 8

5 ml. of phenylacetonitrile and 0.2 gm. of mercuric acetate were heated in an open test tube flushed with nitrogen until metallic mercury was noted on the bottom of the tube. On cooling the liquid was decanted from the metallic mercury into two volumes of methanol and cooled in an ice-water bath. The white crystals that formed were filtered and dried and identified as the dimer, α-β-diphenylsuccinonitrile, M.P. 222–224° C.

As is apparent from the foregoing embodiments, the desired dimer formation occurs by direct reaction between the compound to be dimerized and the metal salt without requiring the presence of oxygen to effect dimerization. However, if desired, oxygen may be used in the manner illustrated by Examples Nos. 4 and 5 to reoxidize the metal salt in situ or, if preferred, the metal salt or, for example, the free metal as in the case of mercury, may be reoxidized externally and reused for the dimerization reaction. For such a purpose, any of many suitable oxidizing agents may be used such as oxygen, a free-oxygen-containing gas such as air, iodine, etc.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process which comprises reacting an organic compound containing an active hydrogen atom in liquid phase with a metal ion oxidant introduced as a compound from the group consisting of oxides and organic carboxylic acid salts of said metal selected from the group consisting of copper, silver, mercury, and iron, said metal ion oxidant undergoing reduction during the dimerization reaction, said metal compound reacting with a substantially stoichiometrically equivalent amount of said organic compound and in which reaction the sole oxidation reactant with said organic compound is said metal ion, said organic compound being a member from the group consisting of

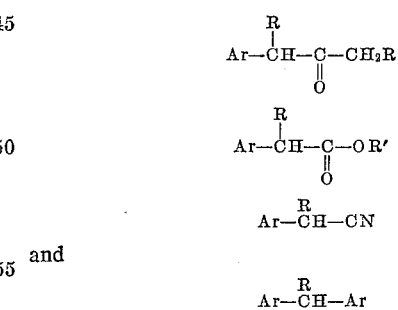

in which Ar is phenyl, R represents a member from the group consisting of hydrogen and alkyl, and R' is alkyl whereby said organic compond is dimerized by oxidation and removal of a said active hydrogen atom from each of two molecules of said organic compound and formation of a dimer therefrom.

2. A process, as defined in claim 1, wherein the organic compound is contacted with the metal compound at from about 50 to about 250° C.

3. A process as defined in claim 1 wherein the organic compound is methylphenylacetate.

4. A process as defined in claim 1 wherein the organic compound is phenylacetonitrile.

5. A process as defined in claim 1 wherein the organic compound is phenylacetone.

6. A process as defined in claim 1 wherein the organic compound is diphenylmethane.

7. A process as defined in claim 1 wherein the metal compound is iron octanoate.

8. A process as defined in claim 1 wherein the metal compound is silver acetate.

9. A process as defined in claim 1 wherein the metal compound is cupric acetate.

10. A process as defined in claim 1 wherein the metal compound is mercuric acetate.

11. A process as defined in claim 1 wherein the metal compound is copper benzoate.

References Cited in the file of this patent
UNITED STATES PATENTS

| | | |
|---|---|---|
| 2,524,319 | Kharasch | Oct. 3, 1950 |
| 2,751,406 | Ipatieff et al. | June 19, 1956 |